United States Patent

Sprague et al.

[15] 3,706,790
[45] Dec. 19, 1972

[54] (MONO-AND DI-SUBSTITUTED SULFAMOYL) BENZOIC ACIDS

[72] Inventors: James M. Sprague, Gwynedd Valley; Carl Ziegler, Glenside, both of Pa.

[73] Assignee: Merck & Co., Inc., Rahway, N.J.

[22] Filed: Feb. 27, 1970

[21] Appl. No.: 15,203

[52] U.S. Cl........260/518 A, 260/247.1, 260/293.73, 260/294.8, 260/326.3, 260/465 E, 260/470, 260/501.12, 260/516, 260/518 R, 260/556 AR, 424/248, 424/263, 424/267, 424/274, 424/319, 424/324
[51] Int. Cl............................................C07c 143/78
[58] Field of Search .......260/518, 470, 518 R, 518 A

[56] References Cited

UNITED STATES PATENTS

| 3,050,553 | 8/1962 | Novello | 260/518 A |
| 3,493,584 | 2/1970 | Weinstock et al. | 260/518 A |

OTHER PUBLICATIONS

Royals, E. E. Advanced Organic Chemistry, 4th Edtn; pdr. by Prentice-Hall, Inc. (1961) QD251R68c.6, page 638
Finar, I. L., Organic Chemistry, Vol. I (1963), Pub. by Richard Clay & Co. London, QP251P56, pages 340 and 564

*Primary Examiner*—Lorraine A. Weinberger
*Assistant Examiner*—L. Arnold Thaxton
*Attorney*—Joseph W. Molasky, I. Louis Wolk and J. Jerome Behan

[57] ABSTRACT

(Mono- and di-substituted sulfamoyl)benzoic acids and the salt, ester and amide derivatives thereof wherein the benzene ring may be substituted by one or more halo, lower alkyl, trihalomethyl, sulfamoyl, alkylsulfonyl, nitro, carboxy, amino, halosulfonyl or hydrocarbylene radicals. The products are prepared by treating a halosulfonylbenzoic acid with a primary or secondary amine and are useful as uricosuric agents in the treatment of gout and gouty arthritis.

4 Claims, No Drawings

(MONO- AND DI-SUBSTITUTED SULFAMOYL) BENZOIC ACIDS

This invention relates to a new class of chemical compounds which can be described generally as (mono- or di-substituted sulfamoyl)benzoic acids and the non-toxic, pharmaceutically acceptable salts, esters and amides thereof. It is also an object of this invention to describe a novel method for the preparation of the (mono- or di-substituted sulfamoyl)-benzoic acids.

Pharmacological studies indicate that the instant products are effective uricosuric agents, i.e., they promote the excretion of uric acid by the kidney, and are thus useful in the treatment of gout and gouty arthritis. The instant products are also a valuable adjuvant for inhibiting excretion of penicillin, thus maintaining high antibiotic levels in the treatment of conditions that require intensive penicillin therapy.

The (mono- and di-substituted sulfamoyl) benzoic acids of this invention are compounds having the following structural formula:

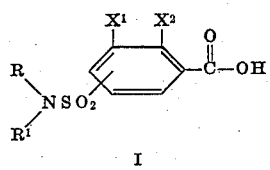

I wherein R is hydrogen, alkyl, for example, lower alkyl such as ethyl, n-propyl, n-butyl, pentyl, hexyl and the like, cycloalkyl, for example, a mononuclear cycloalkyl containing from five to six nuclear carbon atoms such as cyclopentyl, cyclohexyl and the like; $R^1$ is alkyl, for example, lower alkyl such as ethyl, n-propyl, n-butyl, pentyl, hexyl and the like, cycloalkyl, for example, a mononuclear cycloalkyl containing from five to six nuclear carbon atoms such as cyclopentyl, cyclohexyl and the like and, taken together, R and $R^1$ may be joined, together with the nitrogen to which they are attached, to form a saturated 5- or 6-membered heterocyclic ring such as pyrrolidinyl, morpholino, 1-piperidino and the like; $X^1$ is halo such as bromo, chloro, fluoro and the like, lower alkyl such as methyl and the like, trihalomethyl such as trifluoromethyl and the like, alkylsulfonyl, for example, lower alkylsulfonyl such as methylsulfonyl, ethylsulfonyl and the like, carboxy, sulfamoyl, nitro, amino or halosulfonyl such as chlorosulfonyl and the like; $X^2$ is hydrogen, halo such as bromo, chloro, fluoro and the like, lower alkyl such as methyl and the like, alkylsulfonyl, for example, lower alkylsulfonyl such as methylsulfonyl, ethylsulfonyl and the like, sulfamoyl, nitro, amino or halosulfonyl such as chlorosulfonyl and the like, or $X^1$ and $X^2$ may be joined together to form a hydrocarbylene chain containing four carbon atoms between their points of attachment, for example, a tetramethylene or 1,3-butadienylene chain and the like, and the non-toxic, pharmaceutically acceptable salts as, for example, organic or inorganic salts such as are derived from alkali metal and alkaline earth metal carbonates and hydroxides such as sodium carbonate, sodium hydroxide, magnesium carbonate, calcium hydroxide, potassium hydroxide and the like, ammonia, dialkylamines such as dimethylamine, diethylamine and the like or heterocyclic amines such as piperidine, pyrrolidine, pyridine, morpholine and the like, the esters, for example, the lower alkyl esters, lower alkanamido lower alkyl esters, benzamido lower alkyl esters and the like and the amides, for example, the amide, lower alkylamides and di-lower alkylamides thereof.

A preferred embodiment of this invention relates to the (mono-substituted or di-substituted sulfamoyl)benzoic acids having the following structural formula:

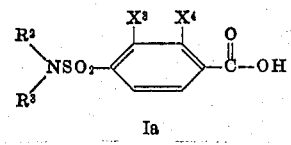

Ia wherein $R^2$ and $R^3$ are alkyl, for example, lower alkyl; $X^3$ is halo, alkylsulfonyl or sulfamoyl and $X^4$ is hydrogen or halo and the alkali metal or alkaline earth metal salts thereof. This class of compounds represents a preferred subgroup of compounds within the scope of this invention.

Those products corresponding to formula I, supra, wherein $X^1$ is halo, lower alkyl, trihalomethyl, lower alkylsulfonyl or nitro and $X^2$ is hydrogen, halo, lower alkyl or nitro or $X^1$ and $X^2$ are joined together to form a hydrocarbylene chain are obtained by treating a halosulfonylbenzoic acid (II, infra) with a suitable amine of the formula:

wherein R and $R^1$ are as defined above. Any solvent which is substantially inert to the reactants may be employed as, for example, acetone, benzene, pyridine and the like; however, it is preferred to use an excess of the amine which is employed as the starting material in the process. The temperature at which the reaction is conducted is not critical but, in general, it is most desirable to conduct the process at a temperature in the range of from about 25° to 100°C. The following equation illustrates this process:

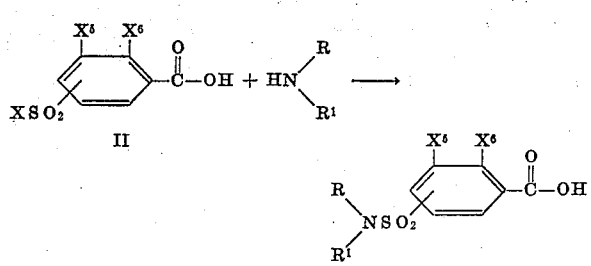

wherein R and $R^1$ are as defined above; X is halo such as bromo, chloro and the like; $X^5$ is halo, lower alkyl, trihalomethyl, alkylsulfonyl or nitro and $X^6$ is hydrogen, halo, lower alkyl or nitro or $X^5$ and $X^6$ may be joined together to form a hydrocarbylene chain.

When the product obtained according to the foregoing method is a 2,3-dihalo)mono- or di-substituted sulfamoyl)-benzoic acid (If, infra), it may be converted to the 2,3-di-lower alkylsulfonyl(mono- or di-substituted sulfamoyl)-benzoic acid (Ic, infra) by the following method. The 2,3-dihalo(mono- or di-substituted sulfamoyl)benzoic acid (Id) is treated with sodium hydrosulfide in a suitable solvent such as ethanol in a pressure vessel at a temperature in the range of from 125° to 175°C. to form the corresponding 2,3-dimercapto-(mono- or di-substituted sulfamoyl)benzoic acid (Ie, infra) which is then treated with an alkylating agent such as dimethylsulfate, diethylsulfate and the like in the presence of a base such as sodium hydroxide to form the 2,3-di-lower alkylthio-(mono- or di-substituted sulfamoyl)benzoic acid (Id, infra) which upon treatment with an oxidizing agent such as hydrogen peroxide and the like in a suitable solvent such as an equal volume mixture of acetic acid and acetic anhydride forms the desired 2,3-di-lower alkylsulfonyl(mono- or di-substituted sulfamoyl)benzoic acid (Ic). The following equation illustrates this process:

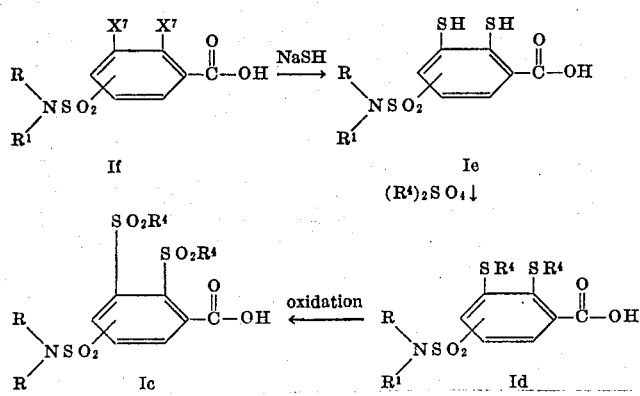

wherein R and R¹ are as defined above, X⁷ is halo and R⁴ is lower alkyl.

When the product obtained according to the foregoing method is a nuclear mono- nitro or di-nitro-substituted (mono- or di-substituted sulfamoyl)benzoic acid, said derivative may be converted to the corresponding nuclear amino, halosulfonyl or sulfamoyl-substituted(mono- or di-substituted sulfamoyl)benzoic acid by one of the following methods.

The nuclear amino-substituted(mono- or di-substituted sulfamoyl)benzoic acids (Ig, infra) are conveniently prepared by catalytic hydrogenation of the corresponding nuclear nitro-substituted(mono- or di-substituted sulfamoyl)-benzoic acid (Ih, infra) with a catalyst such as platinum oxide, Raney catalyst alloy in the presence of sodium hydroxide and the like. Although the temperature at which the reaction is conducted is not critical, it is conveniently conducted at ambient temperatures. The following equation illustrates the process wherein there is one nitro substituent; however, it should be understood that the (mono- or di-substituted sulfamoyl)-2,3-di-nitrobenzoic acids may be substituted therefor to afford the corresponding 2,3-diamino substituted product:

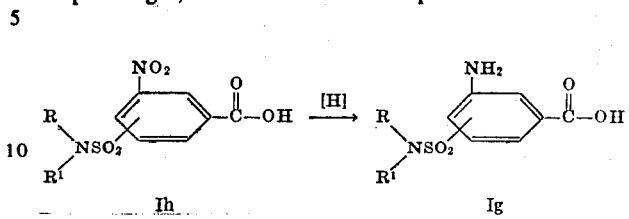

wherein R and R¹ are as defined above.

The nuclear amino-substituted(mono- or di-substituted sulfamoyl)benzoic acids (Ig, supra) obtained according to the aforegoing procedure may be converted to the corresponding nuclear halosulfonyl-substituted(mono- or di-substituted sulfamoyl)benzoic acids (Ii, infra) by treatment with an aqueous solution of sodium nitrite and an acid such as hydrochloric acid, perchloric acid or fluoroboric acid to form the corresponding diazonium salt followed by treating said diazonium salt with a solution of sulfur dioxide and a cuprous halide such as cuprous chloride, cuprous bromide or cuprous fluoride and the like in water or in a lower alkanoic acid such as acetic acid and the like. The reaction may be conducted at temperatures in the range of from about 0°C. up to about 25°C.; however, it is preferred to conduct the process at a temperature range of from about 0°C. to about 5°C. The following equation illustrates the process wherein there is one amino substituent, but the (mono- or di-substituted sulfamoyl)-2,3-di-aminobenzoic acids may be substituted therefore to afford the corresponding 2,3-dihalosulfonylbenzoic acid:

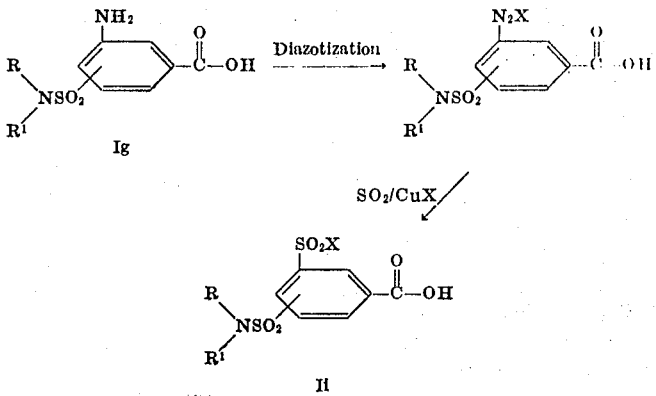

wherein R, R¹ and X are as defined above.

The (mono- or di-substituted sulfamoyl)halosulfonylbenzoic acids (I, supra) may be converted to their corresponding nuclear sulfamoyl-substituted(mono- or di-substituted sulfamoyl)benzoic acids (Ij, infra) by treatment with ammonia. The following equation illustrates the process wherein there is one halosulfonyl substituent, but the (mono- or di-substituted sulfamoyl)-2,3-di-halosulfonylbenzoic acids will afford the corresponding 2,3-disulfamoyl substituted product:

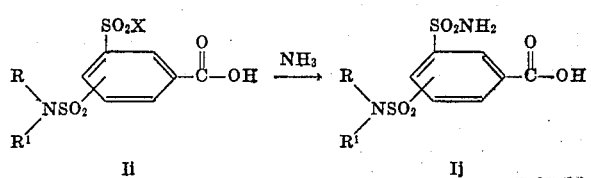

wherein R, $R^1$ and X are as defined above.

The halosulfonylbenzoic acids (II, supra) employed as starting materials in the preparation of the (mono- or di-substituted sulfamoyl)benzoic acids, (I, supra) are either known compounds or may be prepared by either of several methods. One method comprises treating a sulfamoylbenzoic acid with a halosulfonic acid such as chlorosulfonic acid. A second method comprises diazotizing an appropriate amino substituted benzoic acid to form the corresponding diazonium salt followed by treating said salt with sulfur dioxide and a cuprous halide to form the desired halosulfonylbenzoic acid.

The first of the above mentioned processes comprises treating a sulfamoylbenzoic acid (III, infra) with a halosulfonic acid. The following equation illustrates this process:

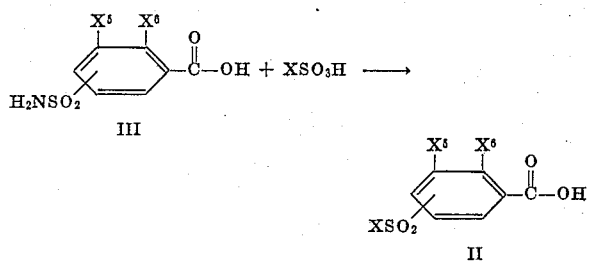

wherein X, $X^5$ and $X^6$ are as defined above.

The second method for preparing the halosulfonylbenzoic acids (II, supra) comprises treating an appropriate nuclear amino-substituted benzoic acid (IV, infra) with an aqueous solution of sodium nitrite and an acid such as hydrochloric acid, perchloric acid, fluoboric acid and the like to form the corresponding diazonium salt followed by treating said diazonium salt with a solution of sulfur dioxide and a cuprous halide such as cuprous chloride, cuprous bromide or cuprous fluoride and the like in a suitable solvent such as water or a lower alkanoic acid such as acetic acid and the like. The reaction may be conducted at temperatures in the range of from about 0°C. up to about 25°C.; however, it is preferred to conduct the process at a temperature in the range of from about 0°C. to about 5°C. The following equation illustrates this process:

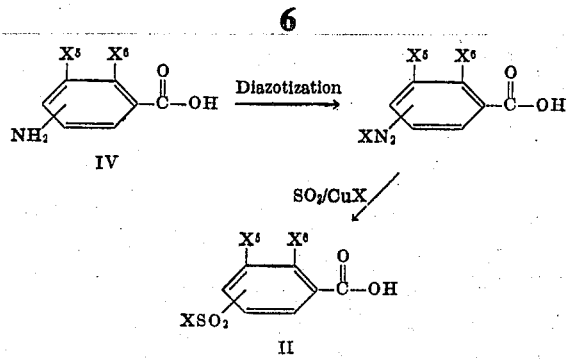

wherein X, $X^5$ and $X^6$ are as defined above.

The sulfamoylbenzoic acids (III, supra) employed in the preparation of the halosulfonylbenzoic acids (II, supra) are conveniently prepared by treating an appropriate cyanobenzenesulfonamide with an aqueous solution of a base such as sodium hydroxide, potassium hydroxide and the like. The following equation illustrates this process:

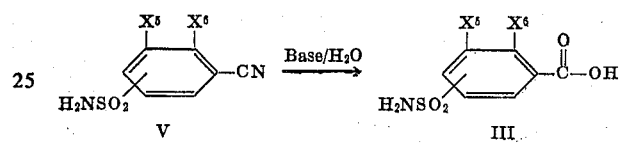

wherein $X^5$ and $X^6$ are as defined above.

The cyanobenzenesulfonamides (V, supra) used in the preparation of the sulfamoylbenzoic acids (III, supra) are prepared by treating an appropriate amino-substituted benzenesulfonamide (VI, infra) with a solution of sodium nitrite and an acid such as hydrochloric acid and the like to form the corresponding diazonium salt. The acidic solution containing the diazonium salt is then adjusted to a pH of about 4 by the addition of an aqueous solution of a base such as sodium hydroxide and the like and is then added to a cuprous cyanide solution to form the desired cyanobenzenesulfonamide (V). The following equation illustrates this process:

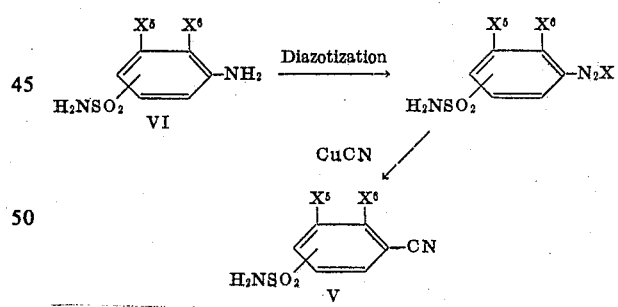

wherein X, $X^5$ and $X^6$ are as defined above.

The amino-substituted benzoic acids (IV, infra) used in the preparation of the halosulfonylbenzoic acids (II, supra) are either known compounds or may be prepared by treating a lower alkanamido substituted benzoic acid (VII, infra) with an aqueous solution of an inorganic acid such as hydrochloric acid and the like. The following equation illustrates this process:

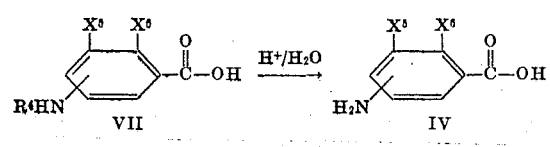

wherein $X^5$ and $X^6$ are as defined above and $R^4$ is lower alkyl such as methyl and the like.

Those lower alkanamidobenzoic acids wherein $X^5$ and $X^6$ are both halo are separated by treating a lower alkanamido-2-halobenzoic acid (VIII, infra) with a halogenating agent such as chlorine, bromine and the like. The reaction is conveniently conducted at room temperature in a solvent which is inert to the reactants, preferably a lower alkanoic acid solvent such as acetic acid and the like. The following equation illustrates this process:

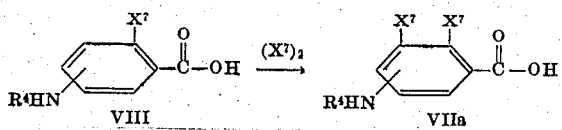

wherein $R^4$ is as defined above and $X^7$ is halo such as chloro, bromo and the like.

Included within the scope of this invention are the non-toxic, pharmaceutically acceptable salts of the instant products. In general, any base which will form a salt with the foregoing (mono- or di-substituted sulfamoyl)benzoic acids and whose pharmacological properties will not cause an adverse physiological effect when ingested by the body system is considered as being within the scope of this invention. Suitable bases include, for example, the organic or inorganic slats such as are derived from the alkali metal and alkaline earth metal carbonates and hydroxides such as sodium carbonate, magnesium carbonate, sodium hydroxide, calcium hydroxide, potassium hydroxide and the like or from ammonia, dialkylamines and heterocyclic amines such as methylamine, ethylamine, dimethylamine, diethylamine, piperidine, pyrrolidine, pyridine, morpholine and the like.

Also included within the scope of this invention are the ester and amide derivatives of the instant products. The ester and amide derivatives may be prepared by the reaction of a (mono- or di-substituted sulfamoyl)benzoic acid of this invention with an alcohol as, for example, an alkanol such as a lower alkanol including methanol, ethanol and the like, lower alkanamido lower alkanols such as 2-acetamidoethanol and the like, benzamido lower alkanols such as benzamidoethanol and the like or with ammonia or an amine, for example, mono- or dialkylamine, such as methylamine, dimethylamine, diethylamine and the like or, alternatively, the sulfamoylbenzoic acid may be converted to its acid halide by conventional methods and the acid halide treated with an appropriate alcohol or amine.

The foregoing and other equivalent methods for the preparation of the salts, esters and amide derivatives of the instant products (I) will be apparent to those having ordinary skill in the art and, to the extent that the said derivatives are both nontoxic and physiologically acceptable to the body system the said salts, esters and amides are the functional equivalent of the (mono- or di-substituted sulfamoyl)benzoic acid product (I).

The samples which follow illustrate the (mono- or di-substituted sulfamoyl)benzoic acids of this invention and the method by which they are prepared. However, the examples are illustrative only and it will be apparent to those having ordinary skill in the art that all of the products embraced by formula I, supra, may also be prepared in an analogous manner by substituting the appropriate starting materials for those set forth in the examples.

EXAMPLE 1

2,3-Dichloro-4-Di-n-propylsulfamoylbenzoic Acid

Step A: 2,3-Dichloro-4-Acetamidobenzoic Acid

A suspension of 2-chloro-4-acetamidobenzoic acid (32.0 g.) in acetic acid (300 ml.) is stirred while chlorine is passed into the mixture at 25°–30°C. for 2 hours. During the first hour, the suspension becomes clear, after which the product begins to crystallize. The product is collected by filtration and is washed successively with a small amount of acetic acid and water and then air dried to afford 9.5 g. of 2,3-dichloro-4-acetamidobenzoic acid, m.p. 201°–203°C.

Step B: 2,3-Dichloro-4-Aminobenzoic Acid 2,3-Dichloro-4-acetamidobenzoic acid (6.0 g.) is dissolved in a 5 percent hydroxide (40 ml.) and is heated at 90°C. for 3 hours. The reaction mixture is cooled and is acidified with dilute hydrochloric acid. The crude product obtained is recrystallized from 50 percent aqueous alcohol to afford 2,3-dichloro-4-aminobenzoic acid, m.p. 229°–231°C.

Step C: 2,3-Dichloro-4-Di-n-propylsulfamoylbenzoic Acid

A suspension of 2,3-dichloro-4-aminobenzoic acid (12.4 g.) in acetic acid (30 ml.) and concentrated hydrochloric acid (15 ml.) is cooled and stirred while a solution of sodium nitrite (4.2 g.) in water (10 ml.) is added, slowly, dropwise, at such a rate that the temperature does not exceed 5°C. Meanwhile, 30 g. of sulfur dioxide is dissolved in acetic acid (60 ml.). To this is added cupric chloride (8.0 g.) in water (15 ml.). The diazonium chloride is then added to the sulfur dioxide solution. After standing for an hour, the product is collected by filtration. The 2,3-dichloro-4-chlorosulfonylbenzoic acid is added to di-n-propylamine (50 ml.). After the initial vigorous reaction, the reaction mixture is allowed to stand for an hour and then is poured into water and acidified with dilute hydrochloric acid to afford 2,3-dichloro-4-di-n-propylsulfamoylbenzoic acid which after recrystallization from etherhexane has a melting point of 156°–158°C.

Elemental analysis for $C_{13}H_{17}Cl_2NO_4S$:
Calc.: C, 44.07; H, 4.84; Cl, 20.02; N, 3.95;
Found: C, 44.53; H, 4.72; Cl, 19.61; N, 3.91.

EXAMPLE 2

3-Chloro-4-Di-n-propylsulfamoylbenzoic Acid

Step A: 2-Chloro-4-Cyanobenzenesulfonamide

A suspension of 2-chlorosulfanilamide (65.1 g., 0.3 mole) in 300 mg. of 4N hydrochloric acid is cooled to 0°C. and a solution of sodium nitrite (21 g., 0.3 mole) in 35 ml. of water is added, with good stirring, at such a rate that the temperature remains below 5°C. At this point, about 80 ml. of a 40 percent solution of sodium hydroxide is added until the pH is about 4. Meanwhile, sodium cyanide (64 g., 1.3 mole) is added, carefully, in portions, to a solution of copper sulfate pentahydrate (78 g.) in 420 ml. of water. The solution of the diazonium salt is then added to the cuprous cyanide solution as rapidly as foaming allows. The suspension is stirred at room temperature overnight. The product is collected by filtration, dried and is isolated by extracting into benzene using a continuous extractor. There is obtained 41.5 g. of 2-chloro-4-cyanobenzenesulfonamide, m.p. 180°–183°C.

Step B: 3-Chloro-4-Sulfamoylbenzoic Acid

A solution of 2-chloro-4-cyanobenzenesulfonamide (20 g.) in 200 ml. of 10 percent sodium hydroxide is heated for 6 hours at 90°C. Acidification of the reaction mixture affords 3-chloro-4-sulfamoylbenzoic acid. Purification is accomplished by dissolving the product in a sodium bicarbonate solution and reprecipitating with dilute hydrochloric acid to afford substantially pure 3-chloro-4-sulfamoylbenzoic acid, m.p. 223°–225 °C.

Step C: 3-Chloro-4-Di-n-propylsulfamoylbenzoic Acid

A solution of 3-chloro-4-sulfamoylbenzoic acid (13.3 g.) in 40 ml. of chlorosulfonic acid is heated at 90°C. for 3 hours. The reaction mixture is poured onto ice and the solid that separates is removed by filtration, washed with water and air dried. The crude 3-chloro-4-chlorosulfonylbenzoic acid (7.6 g.) is added to a solution of di-n-propylamine (10.1 g.) in 15 ml. of acetone. After the initial vigorous reaction, the reaction mixture is warmed on the steam bath to remove the excess acetone and the residue is poured into water and acidified with dilute hydrochloric acid to afford 3-chloro-4-di-n-propylsulfamoylbenzoic acid. The product is dissolved in a warm sodium hydroxide solution (10%; 150 ml.). The solution is cooled and acidified with dilute hydrochloric acid to afford 3-chloro-4-di-n-propylsulfamoylbenzoic acid having an m.p. of 185°–189°C. Recrystallization from a 50 percent aqueous ethanol solution affords substantially pure product, m.p. 188°–190°C.

Elemental analysis for $C_{13}H_{18}ClNO_4S$:
Calc.: C, 48.82; H, 5.67; N, 4.38;
Found: C, 48.94; H, 5.71; N, 4.34.

EXAMPLE 3

4-Di-n-propylsulfamoyl-3-Methylbenzoic Acid

A suspension of 4-amino-3-methylbenzoic acid (15.1 g.) 0.1 mole) in acetic acid (50 ml.) and hydrochloric acid (25 ml.) is stirred and cooled to 0°C. A solution of sodium nitrite (6.9 g.) in water (10 ml.) is added, slowly, dropwise, at such a rate that the temperature never exceeds 5°C. At the same time 30 g. of sulfur dioxide is dissolved in acetic acid (75 ml.) and cupric chloride (7.0 g.) in water (10 ml.) is added. The diazonium salt then is added to the sulfur dioxide solution as fast as foaming allows. After standing for 2 hours the reaction mixture is poured into a liter of ice water and filtered. The crude residue is added to di-n-propylamine (50.0 ml.). After half an hour, the excess amine is removed under reduced pressure, the residue is dissolved in a solution of dilute sodium hydroxide and the product is reprecipitated by acidification with dilute hydrochloric acid to afford 4.5 g. of 4-di-n-propylsulfamoyl-3-methylbenzoic acid, which after several recrystallizations from ethanol has an m.p. of 194°–196°C.

Elemental analysis for $C_{14}H_{21}NO_4S$:
Calc.: C, 56.16; H, 7.07; N, 4.68;
Found: C, 56.22; H, 6.76; N, 4.60.

EXAMPLE 4

4-Di-n-propylsulfamoyl-3-Nitrobenzoic Acid

By substituting an equivalent amount of 4-amino-3-nitrobenzoic acid for the 4-amino-3-methylbenzoic acid of Example 3 and following the procedure described therein, there is obtained 4-di-n-propylsulfamoyl-3-nitrobenzoic acid, m.p. 150°–152°C. (resolidifying and remelting at 160°–162°C.) after recrystallization from benzene.

Elemental analysis for $C_{13}H_{18}N_2O_6S$:
Calc.: C, 47.26; H, 5.49; N, 8.48;
Found: C, 47.09; H, 5.30; N, 8.51.

EXAMPLE 5

3-Amino-4-Di-n-propylsulfamoylbenzoic Acid

A solution of 4-di-n-propylsulfamoyl-3-nitrobenzoic acid in ethanol is shaken in an atmosphere of hydrogen in the presence of platinum oxide as a catalyst to afford 3-amino-4-di-n-propylsulfamoylbenzoic acid, m.p. 195°–197°C.

Elemental analysis for $C_{13}H_{20}N_2O_4S$:
Calc.: C, 51.98; H, 6.71; N, 9.33;
Found: C, 52.47; H, 6.60; N, 9.36.

EXAMPLE 6

4-Di-n-propylsulfamoyl-3-Sulfamoylbenzoic Acid

A suspension of 3-amino-4-di-n-propylsulfamoylbenzoic acid (15.0 g.) in acetic acid (75 ml.) and hydrochloric acid (75 ml.) is cooled to 0°C. and stirred while a solution of sodium nitrite (3.5 g.) in water (10 ml.) is added, slowly, dropwise at such a rate that the temperature remains at less than 5°C. Meanwhile, 35 g. of sulfur dioxide is dissolved in acetic acid (70.0 ml.) and cupric chloride (3.0 g.) in water (10 ml.) is added. The diazonium salt then is added as fast as frothing allows. The reaction mixture is allowed to stand for 2 hours, the 4-di-n-propylsulfamoyl-3-chlorosulfonylbenzoic acid is collected by filtration, washed with water and then added to liquid ammonia (50 ml.). The excess ammonia is allowed to evaporate and the residue is dissolved in water and acidified with dilute hydrochloric acid to afford 4-di-n-propylsulfamoyl-3-sulfamoylbenzoic acid having an m.p. of 200°–201°C. after several recrystallizations from 30 percent aqueous alcohol.

Elemental analysis for $C_{13}H_{20}N_2O_6S_2$:
Calc.: C, 42.84; H, 5.53; N, 7.69;
Found: C, 42.91; H, 5.52; N, 7.68.

EXAMPLE 7

4-Di-n-propylsulfamoyl-3-Methylsulfonylbenzoic Acid

Step A: 4-Amino-3-Methylsulfonylbenzoic Acid

A solution of 4-acetamido-3-methylsulfonylbenzoic acid (10.0 g.) in 10 percent sodium hydroxide (50 ml.) is heated under reflux for 1 hour. The solution is cooled and acidified with dilute hydrochloric acid to afford 7.2 g. of 4-amino-3-methylsulfonylbenzoic acid, m.p. 248°–251°C.

Step B: 4-Di-n-propylsulfamoyl-3-Methylsulfonylbenzoic Acid

By substituting an equimolar quantity of 4-amino-3-methylsulfonylbenzoic acid for the 4-amino-3-methylbenzoic acid of Example 3 and by following the procedure described therein, there is obtained 4-di-n-propylsulfamoyl-3-methylsulfonylbenzoic acid, m.p.

151°–153°C. after recrystallization from a mixture of benzene and hexane.

Elemental analysis for $C_{14}H_{21}NO_6S_2$:
Calc.: C, 46.26; H, 5.82; N, 3.85;
Found: C, 46.17; H, 5.44; N, 3.80.

EXAMPLE 8

4-Di-n-propylsulfamoyl-2,3-Dinitrobenzoic Acid

By substituting an equivalent amount of 4-amino-2,3-dinitrobenzoic acid for the 4-amino-3-methylbenzoic acid of Example 3 and following substantially the procedure described therein, there is obtained 4-di-n-propylsulfamoyl-2,3-dinitrobenzoic acid.

EXAMPLE 9

2,3-Diamino-4-Di-n-propylsulfamoylbenzoic Acid

By substituting for the 4-di-n-propylsulfamoyl-3-nitrobenzoic acid of Example 5 an equimolar quantity of 4-di-n-propylsulfamoyl-2,3-dinitrobenzoic acid and by following substantially the procedure described therein, there is obtained 2,3-diamino-4-di-n-propylsulfamoylbenzoic acid.

EXAMPLE 10

4-Di-n-propylsulfamoyl-2,3-Disulfamoylbenzoic Acid

By substituting for the 3-amino-4-di-n-propylsulfamoylbenzoic acid of Example 6 an equimolar quantity of 2,3-diamino-4-di-n-propylsulfamoylbenzoic acid and the following substantially the procedure described therein, there is obtained 4-di-n-propylsulfamoyl-2,3-disulfamoylbenzoic acid.

EXAMPLE 11

4-Di-n-propylsulfamoyl-3-Trifluoromethylbenzoic Acid

By substituting for the 4-amino-3-methylbenzoic acid of Example 3 an equimolar quantity of 4-amino-3-trifluoromethylbenzoic acid and following substantially the procedure described therein, there is obtained 4-di-n-propylsulfamoyl-3-trifluoromethylbenzoic acid.

EXAMPLE 12

3-Di-n-butylsulfamoyl-5-Chlorobenzoic Acid

By substituting for the 4-amino-3-methylbenzoic acid and di-n-propylamine of Example 3 an equimolar quantity of 3-amino-5-chlorobenzoic acid and di-n-butylamine and following substantially the procedure described therein, there is obtained 3-di-n-butylsulfamoyl-5-chlorobenzoic acid.

EXAMPLE 13

2-Di-n-propylsulfamoyl-5-Methylbenzoic Acid

By substituting for the 4-amino-3-methylbenzoic acid of Example 3 an equimolar quantity of 2-amino-5-methylbenzoic acid and following substantially the procedure described therein, there is obtained 2-di-n-propylsulfamoyl-5-methylbenzoic acid.

EXAMPLE 14

4-Di-n-propylsulfamoyl-3-Ethylsulfonylbenzoic Acid

Step A: 4-Amino-3-Ethylthiobenzoic Acid

To a solution of 4-amino-3-mercaptobenzoic acid in a 10 percent sodium hydroxide solution is added to a 10 percent molar excess of diethyl sulfate while maintaining the temperature below 10°C. Acidification with dilute hydrochloric acid yields 4-amino-3-ethylthiobenzoic acid.

Step B: 4-Acetamido-3-Ethylsulfonylbenzoic Acid

A solution of 4-amino-3-ethylthiobenzoic acid (19.5 g.) in acetic acid (80 ml.) and acetic anhydride (80 ml.) is cooled and stirred while 30 percent hydrogen peroxide (34.0 g.) is added dropwise. The reaction mixture is allowed to come to room temperature and is allowed to stand at room temperature overnight. The reaction mixture is filtered to afford 4-acetamido-3-ethylsulfonylbenzoic acid.

Step C: 4-Amino-3-Ethylsulfonylbenzoic Acid

A solution of 4-acetamido-3-ethylsulfonylbenzoic acid (10.0 g.) in 10 percent sodium hydroxide solution (50 ml.) is heated under reflux for 1 hour. The solution is cooled and acidified with dilute hydrochloric acid to afford 4-amino-3-ethylsulfonylbenzoic acid.

Step D: 4-Di-n-propylsulfamoyl-3-Ethylsulfonylbenzoic Acid

By substituting for the 4-amino-3-methylbenzoic acid of Example 3 an equimolar quantity of 4-amino-3-ethylsulfonylbenzoic acid and following substantially the procedure described therein, there is obtained 4-di-n-propylsulfamoyl-3-ethylsulfonylbenzoic acid.

EXAMPLE 15

2,3-Di-(methylsulfonyl)-4-Di-n-propylsulfamoylbenzoic Acid

Step A: 2,3-Dimercapto-4-Di-n-propylsulfamoylbenzoic Acid

A solution of sodium hydrosulfide is prepared by dissolving sodium (6.9 g.) in ethanol (150 ml.) and bubbling in hydrogen sulfide, with cooling, until 10 g. has been absorbed. 2,3-Dichloro-4-di-n-propylsulfamoylbenzoic acid (35.4 g.) is then added to this solution and the reaction mixture is heated in a pressure vessel at 150°C. for 10 hours. The reaction mixture is cooled and the solvent removed under reduced pressure. The residue is triturated with dilute hydrochloric acid to afford 2,3-dimercapto-4-di-n-propylsulfamoylbenzoic acid.

Step B: 2,3-Di-(methylthio)-4-Di-n-propylsulfamoylbenzoic Acid

To a solution of 2,3-dimercapto-4-di-n-propylsulfamoylbenzoic acid (5.0 g.) in a 10 percent sodium hydroxide solution (30 ml.) is slowly added a 10 percent molar excess of dimethylsulfate, dropwise, while maintaining the temperature below 10°C. The reaction mixture is then acidified with dilute hydrochloric acid to afford 2,3-di-(methylthio)-4-di-n-propylsulfamoylbenzoic acid.

Step C: 2,3-Di-(methylsulfonyl)-4-Di-n-propylsulfamoyl-benzoic Acid

To a cooled solution of 2,3-di(methylthio)-4-di-n- propylsulfamoylbenzoic acid (3.0 g.) in acetic acid (10 ml.) in acetic anhydride (10 ml.) is added 30 percent hydrogen peroxide (6.0 g.). The reaction mixture is slowly brought to room temperature and allowed to stand at room temperature overnight. Removal of the solvent affords 2,3-di-(methylsulfonyl)-4-di-n-propylsulfamoylbenzoic acid.

EXAMPLE 16

Ethyl 2,3-Dichloro-4-Di-n-propylsulfamoylbenzoate

Step A: 2,3-Dichloro-4-Di-n-propylsulfamoylbenzoyl Chloride

A mixture of 2,3-dichloro-4-di-n-propylsulfamoylbenzoic acid (5.0 g.) and thionyl chloride (20 ml.) is refluxed for 3 hours. The excess thionyl chloride is removed under reduced pressure to yield 2,3-dichloro-4-di-n-propylsulfamoylbenzoyl chloride.

Step B: Ethyl 2,3-Dichloro-4-Di-n-propylsulfamoylbenzoate 2,3-Dichloro-4-di-n-propylsulfamoylbenzoyl chloride is added to absolute ethanol at 0°C. The reaction mixture is allowed to come to room temperature and is stirred an additional 3 hours at room temperature. The solvent is removed at reduced pressure to afford ethyl 2,3-dichloro-4-di-n-propylsulfamoylbenzoate.

By substituting for the ethanol in Example 16, Step B, an equimolar quantity of methanol, 2-acetamidoethanol and benzamidoethanol and following substantially the procedure described therein, there is obtained, respectively, methyl 2,3-dichloro-4-di-n-propylsulfamoylbenzoate, 2-acetamidoethyl 2,3-dichloro-4-di-n-propylsulfamoylbenzoate and benzamidoethyl 2,3-dichloro-4-di-n-propylsulfamoylbenzoate.

EXAMPLE 17

2,3-Dichloro-4-Di-n-propylsulfamoylbenzamide

By substituting for the ethanol of Example 16, Step B, an equimolar quantity of ammonia and following substantially the procedure described therein, there is obtained 2,3-dichloro-4-di-n-propylsulfamoylbenzamide.

By substituting with ammonia recited in Example 17, an equimolar quantity of dimethylamine and diethylamine and following substantially the procedure described therein, there is obtained, respectively, dimethyl 2,3-dichloro-4-di-n-propylsulfamoylbenzamide and diethyl 2,3-dichloro-4-di-n-propylsulfamoylbenzamide.

In a manner similar to that described in Example 3 for the preparation of 4-di-n-propylsulfamoyl-3-methylbenzoic acid, all of the (mono- or di-substituted sulfamoyl)benzoic acids of this invention wherein $X^1$ is halo, lower alkyl, trihalomethyl, lower alkylsulfonyl, carboxy or nitro and $X^2$ is hydrogen, halo, lower alkyl or nitro or $X^1$ and $X^2$ may be joined together to form a hydrocarbylene chain, may be obtained. Thus, by substituting the appropriate substituted aminobenzoic acid for the 4-amino-3-methylbenzoic acid of Example 3, and by following substantially the procedure described therein, the products of this invention may be obtained. The following equation illustrates the reactions of Example 3 and, together with Table I, illustrate the aminobenzoic acid starting materials, the corresponding intermediates and the (mono- or di-substituted sulfamoyl)benzoic acid products obtained thereby:

TABLE I

| Example | $R^2$ | $R^3$ | $X^3$ | $X^4$ |
|---|---|---|---|---|
| 18 | H | —C₂H₅ | Cl | Cl |
| 19 | —C₂H₅ | —C₂H₅ | —CH₃ | —CH₃ |
| 20 | —n-C₄H₉ | —n-C₄H₉ | —CH=CH CH=CH— | |
| 21 | —n-C₅H₁₁ | —n-C₅H₁₁ | —CF₃ | H |
| 22 | —n-C₆H₁₃ | —n-C₆H₁₃ | —C(O)—OH | H |
| 23 | —⟨S⟩ | —⟨S⟩ | —CH₂CH₂CH₂CH₂— | |
| 24 | —⟨S⟩ | —⟨S⟩ | Cl | H |
| 25 | —CH₂CH₂CH₂CH₂— | | Cl | Cl |
| 26 | —CH₂CH₂O CH₂CH₂— | | —CF₃ | H |
| 27 | —CH₂CH₂CH₂CH₂CH₂— | | Br | H |

The novel compounds of this invention are uricosuric agents which can be administered in a wide variety of therapeutic dosages in conventional vehicles as, for example, by oral administration in the form of a tablet or by intravenous injection. Also, the daily dosage of the products may be varied over a wide range as, for example, in the form of scored tablets containing 5, 10, 25, 50, 100, 150, 250 and 500 milligrams of the active ingredient for the symptomatic adjustment of the dosage to the patient to be treated. These dosages are well below the toxic or lethal dose of the products which may be administered in a total daily dosage of from 100 to 2,000 mg. in a pharmaceutically acceptable carrier.

A suitable unit dosage form of the products of this invention can be administered by mixing 50 milligrams of 2,3-dichloro-4di-n-propylsulfamoylbenzoic acid or a suitable salt with 149 mg. of lactose and 1 mg. of magnesium stearate and placing the 200 mg. mixture into a No. 2 gelatin capsule. Similarly, by employing more of the active ingredient and less lactose, other dosage forms can be put up in No. 2 gelatin capsules and, should it be necessary to mix more than 200 mg. of ingredients together, larger capsules may be employed. Compressed tablets, pills, or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a unit dosage form or to combine one or more of the compounds of this invention with other known uricosurics or with other desired therapeutic and/or nutritive agents in dosage unit form.

The following example is included to illustrate the preparation of a representative dosage form:

EXAMPLE 28

Dry-filled capsules containing 50 mg. of active ingredient per capsule

| | Per Capsule |
|---|---|
| 2,3-Dichloro-4-Di-n-propyl-sulfamoylbenzoic acid | 50 mg. |
| Lactose | 149 mg. |
| Magnesium Stearate | 1 mg. |
| Capsule (Size No. 1) Total: | 200 mg. |

The 2,3-Dichloro-4-di-n-propylsulfamoylbenzoic acid is reduced to a No. 60 powder and then lactose and magnesium stearate are passed through a No. 60 bolting cloth onto the powder and the combined ingredients admixed for 10 minutes and then filled into a No. 1 dry gelating capsule.

Similar dry-filled capsules can be prepared by replacing the active ingredient of the above example by any of the other novel compounds of this invention.

It will be apparent from the foregoing description that the (mono- or di-substituted sulfamoyl)benzoic acid products (I) of this invention constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A compound of the formula:

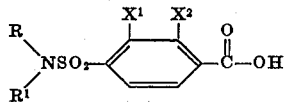

wherein R is hydrogen, lower alkyl or mononuclear cycloalkyl containing from five to six nuclear carbon atoms; $R^1$ is lower alkyl or mononuclear cycloalkyl containing from five to six nuclear carbon atoms; $X^1$ is halo, lower alkyl, trifluoromethyl, lower alkylsulfonyl, carboxy, nitro, amino or chlorosulfonyl; $X^2$ is hydrogen, halo, lower alkyl, lower alkylsulfonyl, nitro, amino or chlorosulfonyl, or $X^1$ and $X^2$ may be joined to form a hydrocarbylene chain containing four carbon atoms between their points of attachment, and the nontoxic, pharmaceutically acceptable salts and lower alkyl esters thereof.

2. A compound according to Claim 1 of the formula:

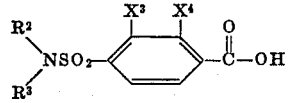

wherein $R^2$ and $R^3$ are lower alkyl; $X^3$ is halo or lower alkylsulfonyl and $X^4$ is hydrogen or halo and the alkali metal or alkaline earth metal salts thereof.

3. A compound according to claim 2 wherein $R^2$ and $R^3$ are lower alkyl and $X^3$ and $X^4$ are halo.

4. A compound according to claim 3 wherein $R^2$ and $R^3$ are n-propyl and $X^3$ and $X^4$ are chloro.

* * * * *